July 11, 1950     G. T. H. ENQUIST     2,514,569
RELEASABLE COUPLING DEVICE
Filed Nov. 16, 1945     2 Sheets-Sheet 1

INVENTOR
Gösta Thure Harry Enquist

July 11, 1950        G. T. H. ENQUIST        2,514,569
RELEASABLE COUPLING DEVICE Filed Nov. 16, 1945        2 Sheets-Sheet 2

INVENTOR
Gösta Ture Harry Enquist

Patented July 11, 1950

2,514,569

UNITED STATES PATENT OFFICE 2,514,569

RELEASABLE COUPLING DEVICE

Gösta Thure Harry Enquist, Hammarbyhojden, Sweden

Application November 16, 1945, Serial No. 629,067
In Sweden September 1, 1944

4 Claims. (Cl. 192—38)

This invention relates to a coupling device for engaging a shaft with and disengaging it from a surrounding sleeve member in which device wedging clamps are adapted to lock between the shaft and the surrounding member, the shaft and the surrounding member being axially slidable in relation to each other along contacting surfaces.

According to the invention the contacting surfaces of the shaft and the surrounding member are each provided with a groove, one groove housing a freely rotatable and axially guided ring the other groove forming a cam race for a number of clamps axially guided in said other groove. The axially guided clamps connect the shaft with the surrounding member and alternatively one of the slidable shaft and sleeve members with the freely rotatable ring by wedging at their relative rotation according to the axial displacement of the shaft to the surrounding member. The coupling device may be provided with a rotatable shaft and a fixed surrounding member by means of which the shaft is arrested to the fixed surrounding member and disengaged from it. Alternatively the shaft may be fixed and the surrounding member freely rotatable in which case the surrounding member may be arrested to the shaft or disengaged from it. In a further modification the shaft and the surrounding member are freely rotatable whereby the surrounding member by wedging may be engaged to rotate with the shaft.

The member surrounding the shaft may consist of a sleeve or a ring, a wheel, e. g. a cog-wheel, a band or belt pulley, etc. or have any other convenient form. The coupling device according to the invention is principally advantageous in that the wedging is effected in every position so that an exact engaging, arresting and disengaging may be obtained without any friction or back lash. For example great advantages can be reached by using the invention in a cog-wheel transmission gear inasmuch as a gearing change is achieved exactly without any back lash.

In the accompanying drawings, which show by way of illustration or example, different forms of the device:

Figure 1:
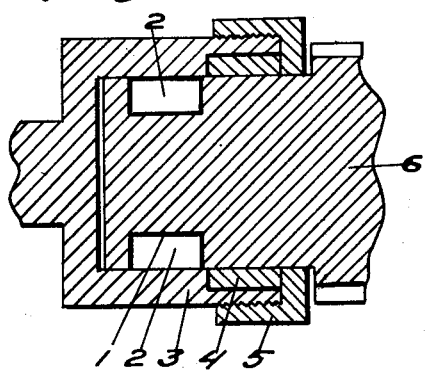
Fig. 1 is a longitudinal section of one form of the device in engaged position.
Figure 2:
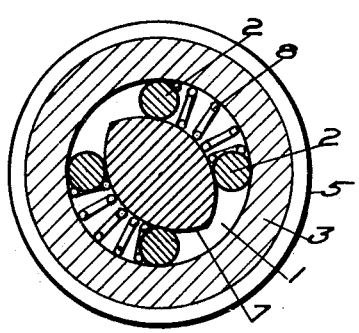
Fig. 2 is a cross section corresponding to Fig. 1.
Figure 3:
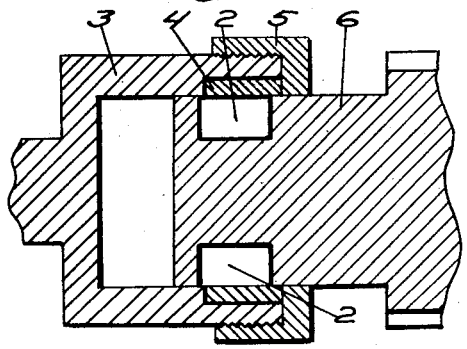
Fig. 3 is a longitudinal section of the structure shown in Figs. 1 and 2 in disengaged position.
Figure 4:
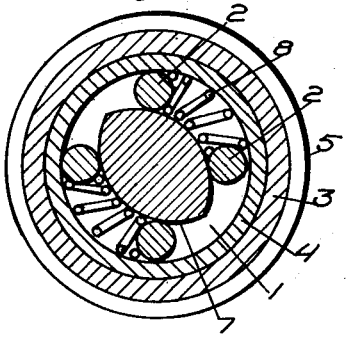
Fig. 4 is a cross section corresponding to Fig. 3.

In the embodiment shown in Figs. 1-4 a rotatable shaft 6 has a groove forming a non-circular cross section 7 on the shaft and in the space between this recessed part 7 and a sleeve 3 surrounding the shaft clamps 2 are inserted, e. g. rollers or balls. The sleeve which may be fixed or rotatable is provided with an inner groove housing a freely rotatable ring 4. Between the pairs of clamps lying on each side of the non-circular cross section of the shaft separating springs are provided. To hold the freely rotatable ring 4 in its place in the sleeve 3, the sleeve may be provided with a flanged ring, threaded on its end. According to the axial displacement of the shaft 6 of the coupling device in relation to the sleeve 3, or vice versa, wedging is effected in one position (Figs. 1-2) between the non-circular cross section 7 of the shaft forming a cam race for the clamps 2 and the surrounding sleeve 3 by turning of the shaft, the shaft being engaged with the sleeve 3, while in the other position (Figs. 3-4) wedging is effected between the non-circular section 7 and the freely rotatable ring 4 by means of the clamps 2.

Figure 5:
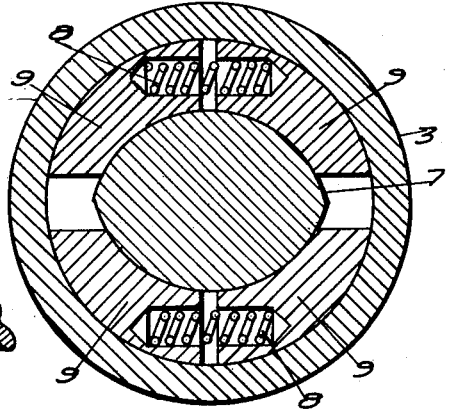
Fig. 5 is a cross section showing a variant form of the clamps producing the wedging effect.

In the modification shown in Fig. 5 the space between the non-circular section 7 of the shaft and the surrounding sleeve is partly filled up by four clamps 9 each of which corresponding to one-fourth of the cam forming groove, is machined into the shaft. The pairs of clamps 9 on each side of the oval section 7 are separated by pressure springs 8.

Figure 6:
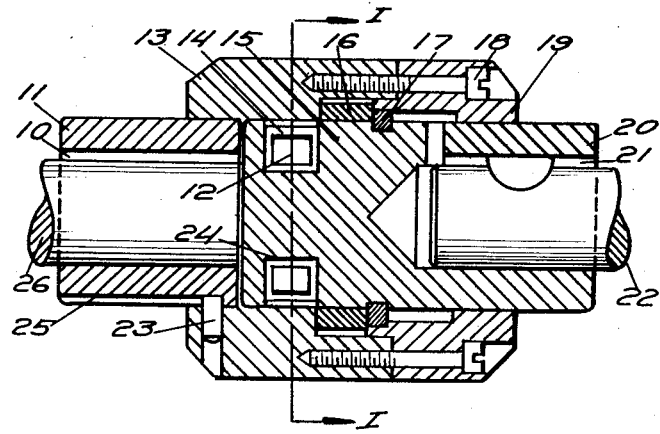
Fig. 6 is a longitudinal section of a modified form of the device.
Figure 7:
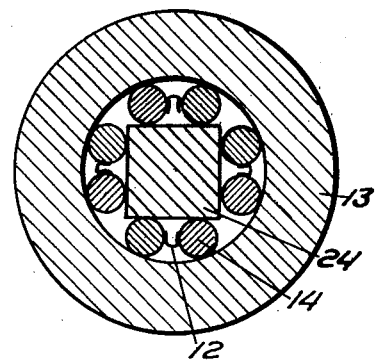
Fig. 7 is a cross section taken on the line I—I, Fig. 6.

Fig. 6 shows a longitudinal section and Fig. 7 a cross section according to the line I—I in Fig. 6 of another modification of the coupling device which is provided with two sleeves 11 and 20 in each of which shafts 26 and 22 are inserted and prevented from turning in relation to the corresponding sleeves by longitudinal grooves and projections 10 and 21. The sleeve 20 fixed to one of the shafts 22 is provided with a non-circular cross section 24, here as shown of a square shape. In the space between the bottom of the groove and a coupling sleeve 13, 19 surrounding the two sleeves 11 and 20 rollers or balls 14 are inserted which lock the sleeve 13, 19 to the sleeve 20 by a wedging effect when the sleeve 13, 19 is turned in relation to the sleeve 20. When the sleeve 13, 19 is displaced in axial direction to the left, the sleeve 13, 19 will be disconnected from the sleeve 20, the clamps 14 being locked by a wedging effect to a ring 16 freely rotatable in an inner groove in the sleeve 13, 19. The sleeve 13, 19 is locked to the shaft 26 in every position by a projecting pin 23 which enters a longitudinal groove 25 in the sleeve 11 surrounding the shaft 26. For the mounting of the sleeve 13, 19 it is divided into two parts 13 and 19 fastened together by screws 18. The displacement of the coupling sleeve in axial direction may suitably be limited by a ring 17 of bearing metal fixed in a groove in the sleeve 20.

Figure 8:
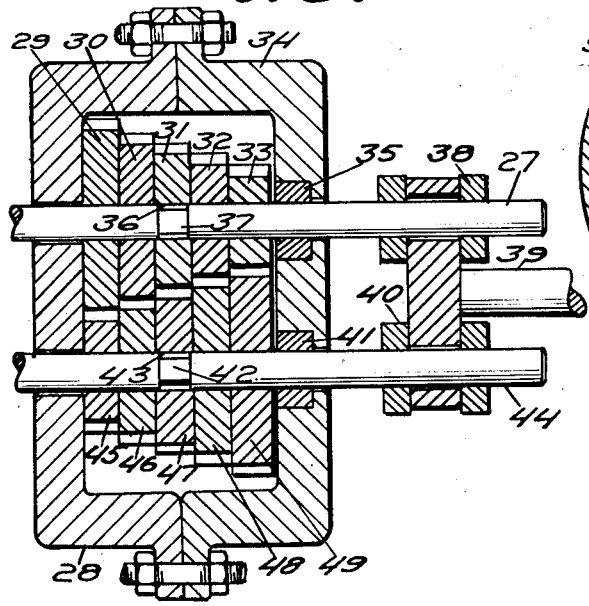
Fig. 8 is a longitudinal section of a cog-wheel transmission gear provided with coupling devices according to the invention.

As a further example of a device according to the invention Fig. 8 shows a transmission gear. The gear housing is divided into two halves 28, 34 bearing two shafts 27, 44, on which cog-wheels 29, 30, 31, 32, 33, respectively 45, 46, 47, 48, 49 are arranged. The shafts 27, 44 are movable together in axial direction by an operating bar 39, which acts simultaneously on the two shafts 27, 44 with a connection 38, 40. On corresponding places the shafts 27, 44 are provided with recessed non-circular cross sections 37, 42 and in the recesses clamps 36, 43 are inserted which by a wedging effect lock to the shafts one or another of the pairs of corresponding cog-wheels 29 and 45, 30 and 46, 31 and 47, 32 and 48, and 33 and 49, respectively. For inter-releasing the shafts freely rotatable rings 35, 41 are provided according to the invention within the bearings of the respective shafts in the half 34 of the gear housing.

Figure 9:
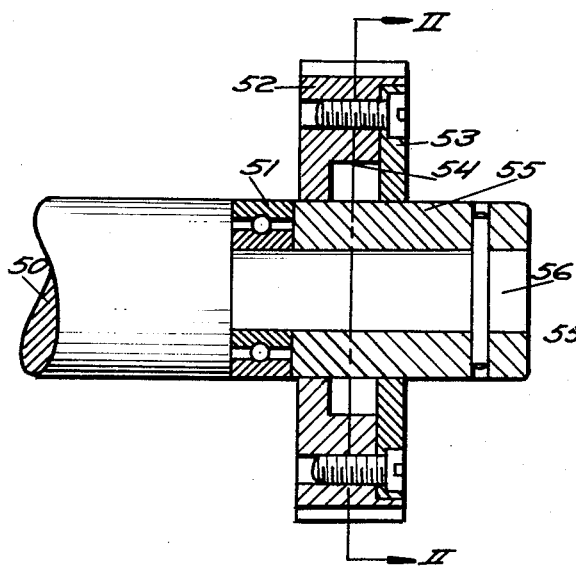
Fig. 9 is a longitudinal section of a further form of the coupling device.
Figure 10:
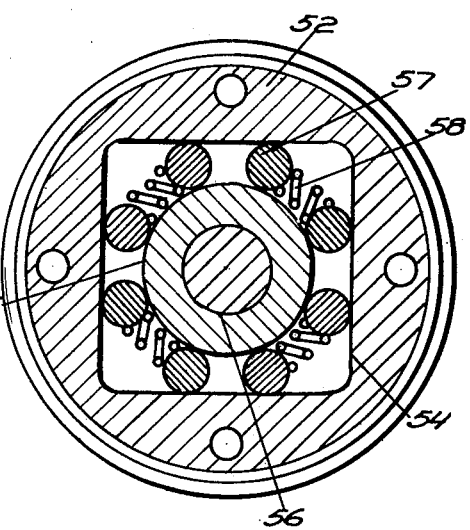
Fig. 10 is a cross section taken on the line II—II, Fig. 9.

Figs. 9 and 10 show a device in which the surrounding member is provided with the non-circular cross section forming the cam race for the clamps and Fig. 9 gives a longitudinal section while Fig. 10 shows a cross section according to the line II—II in Fig. 9. One end of the shaft 50 is cut down to a round tap 56 to which a sleeve 55 is fastened enclosing a ring 51 freely rotatable round the tap 56. The ring 51 may consist of a ball bearing as shown in the figure. The sleeve 55 is surrounded by a member consisting of a cog-wheel 52 and having its inner portion provided with a non-circular cross section 54. This cross section has a chiefly square shape and in the space between that square cross section and the sleeve, clamps 57 are inserted which are separated by springs 58. One side 53 of the cog-wheel may be dismountable for insertion of the clamps 57.

The invention may be varied within the limits given by the claims following hereinafter and the shown examples are to be considered solely as illustrative as regards the possibilities of using the invention. The non-circular cross section may have any number of wedging surfaces and clamps depending on the desired number of wedge angles and the form of the wedging parts.

What I claim is:

1. A coupling device comprising a shaft member and a surrounding sleeve member having contacting surfaces and being axially slidable in relation to each other, the said contacting surfaces being provided each with a groove, one groove housing a freely rotatable and axially guided ring, the other groove forming a cam race for a number of clamps housed axially guided in said other groove, the said clamps connecting the said shaft with the said surrounding member and alternatively one of the said slidable members with the said axially guided ring by wedging at their relative rotation according to the axial displacement of the said shaft to the said surrounding member.

2. A coupling device comprising a freely rotatable shaft and a fixed surrounding sleeve member having contacting surfaces, the said rotatable shaft being axially slidable in relation to the said fixed surrounding member and the said contacting surfaces being provided each with a groove, one groove housing a freely rotatable and axially guided ring, the other groove forming a cam race for a number of clamps housed axially guided in said other groove, the said clamps connecting the said rotatable shaft with the said fixed surrounding member and alternatively with the said axially guided ring by wedging according to the axial displacement of the said rotatable shaft to the said surrounding member.

3. A coupling device comprising a fixed shaft and a freely rotatable surrounding sleeve member having contacting surfaces, the said rotatable surrounding members being axially slidable in relation to the said fixed shaft and the said contacting surfaces being provided each with a groove, one groove housing a freely rotatable and axially guided ring, the other groove forming a cam race for a number of clamps housed axially guided in said other groove, the said clamps connecting the said fixed shaft with the said rotatable surrounding member and alternatively with the said axially guided ring by wedging according to the axial displacement of the said fixed shaft to the said rotatable surrounding member.

4. A coupling device comprising a freely rotatable shaft and a freely rotatable surrounding sleeve member having contacting surfaces and being axially slidable in relation to each other, the said contacting surfaces being provided each with a groove, one groove housing a freely rotatable and axially guided ring, the other groove forming a cam race for a number of clamps housed axially guided in said other groove, the said clamps engaging the said surrounding member to rotate with the said rotatable shaft and alternatively disengaging the said surrounding member from the said rotatable shaft according to the axial displacement of the said rotatable shaft to the said surrounding member.

GÖSTA THURE HARRY ENQUIST.

REFERENCES CITED

The following references are of record in the file of this patent:

UNITED STATES PATENTS

| Number | Name | Date |
| --- | --- | --- |
| 1,680,751 | Spase | Aug. 14, 1928 |
| 2,291,151 | Dunn | July 28, 1942 |
| 2,382,331 | Peterson et al. | Aug. 14, 1945 |